US011740803B2

(12) United States Patent
McColgan et al.

(10) Patent No.: US 11,740,803 B2
(45) Date of Patent: Aug. 29, 2023

(54) SYSTEM AND METHOD FOR STRETCHING STORAGE PROTECTION CONFIGURATIONS IN A STORAGE CLUSTER

(71) Applicant: EMC IP Holding Company, LLC, Hopkinton, MA (US)

(72) Inventors: Lee M. McColgan, Brattleboro, VT (US); Qi Jin, Sudbury, MA (US); Ryan Roberge, Grafton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/507,898

(22) Filed: Oct. 22, 2021

(65) Prior Publication Data

US 2023/0128157 A1 Apr. 27, 2023

(51) Int. Cl.
*G06F 3/06* (2006.01)

(52) U.S. Cl.
CPC .......... *G06F 3/0619* (2013.01); *G06F 3/0604* (2013.01); *G06F 3/067* (2013.01); *G06F 3/0634* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 8,335,899 | B1 * | 12/2012 | Meiri | G06F 11/2069 711/E12.001 |
| 10,719,257 | B1 * | 7/2020 | Meiri | G06F 3/0674 |
| 11,057,264 | B1 * | 7/2021 | Ghare | H04L 41/0654 |
| 2013/0067188 | A1 * | 3/2013 | Mehra | G06F 3/0689 711/170 |
| 2016/0342490 | A1 * | 11/2016 | Deguchi | G06F 3/0644 |
| 2016/0364287 | A1 * | 12/2016 | Johri | G06F 3/0683 |
| 2017/0060705 | A1 * | 3/2017 | Sridhara | G06F 11/2082 |
| 2019/0332297 | A1 * | 10/2019 | Zhang | G06F 21/6218 |
| 2020/0250055 | A1 * | 8/2020 | Zhang | G06F 11/2025 |
| 2020/0326877 | A1 * | 10/2020 | Chen | G06F 21/6272 |
| 2021/0109827 | A1 * | 4/2021 | Vokaliga | G06F 11/2069 |
| 2022/0114061 | A1 * | 4/2022 | Meiri | G06F 11/1658 |

* cited by examiner

*Primary Examiner* — Kaushikkumar M Patel
(74) *Attorney, Agent, or Firm* — Brian J. Colandreo; Heath M. Sargeant; Holland & Knight LLP

(57) ABSTRACT

A method, computer program product, and computing system for copying a storage protection configuration for one or more storage resources from a first storage array to at least a second storage array in a storage cluster. A communication failure between at least a pair of storage arrays may be detected, thus defining a surviving storage array and at least one failed storage array. The communication failure between the surviving storage array and the at least one failed storage array may be resolved. The storage protection configuration may be synchronized from the surviving storage array to the at least one failed storage array. The storage protection configuration for the one or more storage resources of each storage array of the at least a pair of storage arrays may be arbitrated.

17 Claims, 12 Drawing Sheets

SYSTEM AND METHOD FOR STRETCHING STORAGE PROTECTION CONFIGURATIONS IN A STORAGE CLUSTER

BACKGROUND

Storing and safeguarding electronic content may be beneficial in modern business and elsewhere. Accordingly, various methodologies may be employed to protect and distribute such electronic content.

For example, a volume may be configured to be an active/active volume that is accessible from any storage array of a storage cluster. An active/active volume may include a volume replicated on and accessible by each storage array of a storage cluster. For example, a first volume of a first storage array and a second volume of a second storage array may be maintained to be identical.

In some implementations, host servers can read and write to each storage array of the storage cluster. Any write operation to a volume on one storage array may be replicated to the corresponding volume(s) on the other storage array(s) synchronously, while a read operation on the volume can be serviced by the storage array receiving the read command (i.e., "active/active"). In some implementations, each volume may expose the same Small Computer System Interface (SCSI) image at each storage array, including a SCSI ID (a world-wide unique identifier), so that a host does not see multiple storage arrays but may see a more recognizable multi-pathing setup with a single volume. In this manner, the volume may be "stretched" across multiple storage arrays.

When utilizing stretched volumes across multiple storage arrays, managing storage protection configurations/policies on the stretched volumes may introduce consistency challenges. For example, during storage array unavailability, data may be managed by a single storage array and changes to the storage protection configuration of a particular storage array may result in conflicting storage protection configurations/policies.

SUMMARY OF DISCLOSURE

In one example implementation, a computer-implemented method executed on a computing device may include, but is not limited to, copying a storage protection configuration for one or more storage resources from a first storage array to at least a second storage array in a storage cluster. A communication failure between at least a pair of storage arrays may be detected, thus defining a surviving storage array and at least one failed storage array. The communication failure between the surviving storage array and the at least one failed storage array may be resolved. The storage protection configuration may be synchronized from the surviving storage array to the at least one failed storage array. The storage protection configuration for the one or more storage resources of each storage array of the at least a pair of storage arrays may be arbitrated.

One or more of the following example features may be included. Detecting a communication failure between at least a pair of storage arrays may include defining a preferred storage array and at least one non-preferred storage array. Synchronizing the storage protection configuration from the surviving storage array to the at least one restored storage array may include synchronizing the storage protection configuration from the preferred storage array to the at least one non-preferred storage array. One or more changes to the storage protection configuration on the first storage array may be received before the communication failure. The one or more changes may be copied to each storage protection configuration on the at least a second storage array. One or more changes to the storage protection configuration on the surviving storage array may be received during the communication failure, thus defining a updated storage protection configuration. Arbitrating the storage protection configuration for the one or more storage resources of each storage array of the at least a pair of storage arrays may include copying the one or more changes to the storage protection configuration on the at least one failed storage array. Arbitrating the storage protection configuration for the one or more storage resources of each storage array of the at least a pair of storage arrays may include arbitrating the storage protection configuration for the one or more storage resources of each storage array of the at least a pair of storage arrays based upon, at least in part, synchronizing the storage protection configuration from the surviving storage array to the at least one failed storage array.

In another example implementation, a computer program product resides on a computer readable medium that has a plurality of instructions stored on it. When executed by a processor, the instructions cause the processor to perform operations that may include, but are not limited to, copying a storage protection configuration for one or more storage resources from a first storage array to at least a second storage array in a storage cluster. A communication failure between at least a pair of storage arrays may be detected, thus defining a surviving storage array and at least one failed storage array. The communication failure between the surviving storage array and the at least one failed storage array may be resolved. The storage protection configuration may be synchronized from the surviving storage array to the at least one failed storage array. The storage protection configuration for the one or more storage resources of each storage array of the at least a pair of storage arrays may be arbitrated.

One or more of the following example features may be included. Detecting a communication failure between at least a pair of storage arrays may include defining a preferred storage array and at least one non-preferred storage array. Synchronizing the storage protection configuration from the surviving storage array to the at least one restored storage array may include synchronizing the storage protection configuration from the preferred storage array to the at least one non-preferred storage array. One or more changes to the storage protection configuration on the first storage array may be received before the communication failure. The one or more changes may be copied to each storage protection configuration on the at least a second storage array. One or more changes to the storage protection configuration on the surviving storage array may be received during the communication failure, thus defining a updated storage protection configuration. Arbitrating the storage protection configuration for the one or more storage resources of each storage array of the at least a pair of storage arrays may include copying the one or more changes to the storage protection configuration on the at least one failed storage array. Arbitrating the storage protection configuration for the one or more storage resources of each storage array of the at least a pair of storage arrays may include arbitrating the storage protection configuration for the one or more storage resources of each storage array of the at least a pair of storage arrays based upon, at least in part, synchronizing the storage protection configuration from the surviving storage array to the at least one failed storage array.

In another example implementation, a computing system includes at least one processor and at least one memory architecture coupled with the at least one processor, wherein the at least one processor is configured to copy a storage protection configuration for one or more storage resources from a first storage array to at least a second storage array in a storage cluster. The at least one processor may be further configured to detect a communication failure between at least a pair of storage arrays, thus defining a surviving storage array and at least one failed storage array. The at least one processor may be further configured to resolve the communication failure between the surviving storage array and the at least one failed storage array. The at least one processor may be further configured to synchronize the storage protection configuration from the surviving storage array to the at least one failed storage array. The at least one processor may further configured to arbitrate the storage protection configuration for the one or more storage resources of each storage array of the at least a pair of storage arrays.

One or more of the following example features may be included. Detecting a communication failure between at least a pair of storage arrays may include defining a preferred storage array and at least one non-preferred storage array. Synchronizing the storage protection configuration from the surviving storage array to the at least one restored storage array may include synchronizing the storage protection configuration from the preferred storage array to the at least one non-preferred storage array. One or more changes to the storage protection configuration on the first storage array may be received before the communication failure. The one or more changes may be copied to each storage protection configuration on the at least a second storage array. One or more changes to the storage protection configuration on the surviving storage array may be received during the communication failure, thus defining a updated storage protection configuration. Arbitrating the storage protection configuration for the one or more storage resources of each storage array of the at least a pair of storage arrays may include copying the one or more changes to the storage protection configuration on the at least one failed storage array. Arbitrating the storage protection configuration for the one or more storage resources of each storage array of the at least a pair of storage arrays may include arbitrating the storage protection configuration for the one or more storage resources of each storage array of the at least a pair of storage arrays based upon, at least in part, synchronizing the storage protection configuration from the surviving storage array to the at least one failed storage array.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
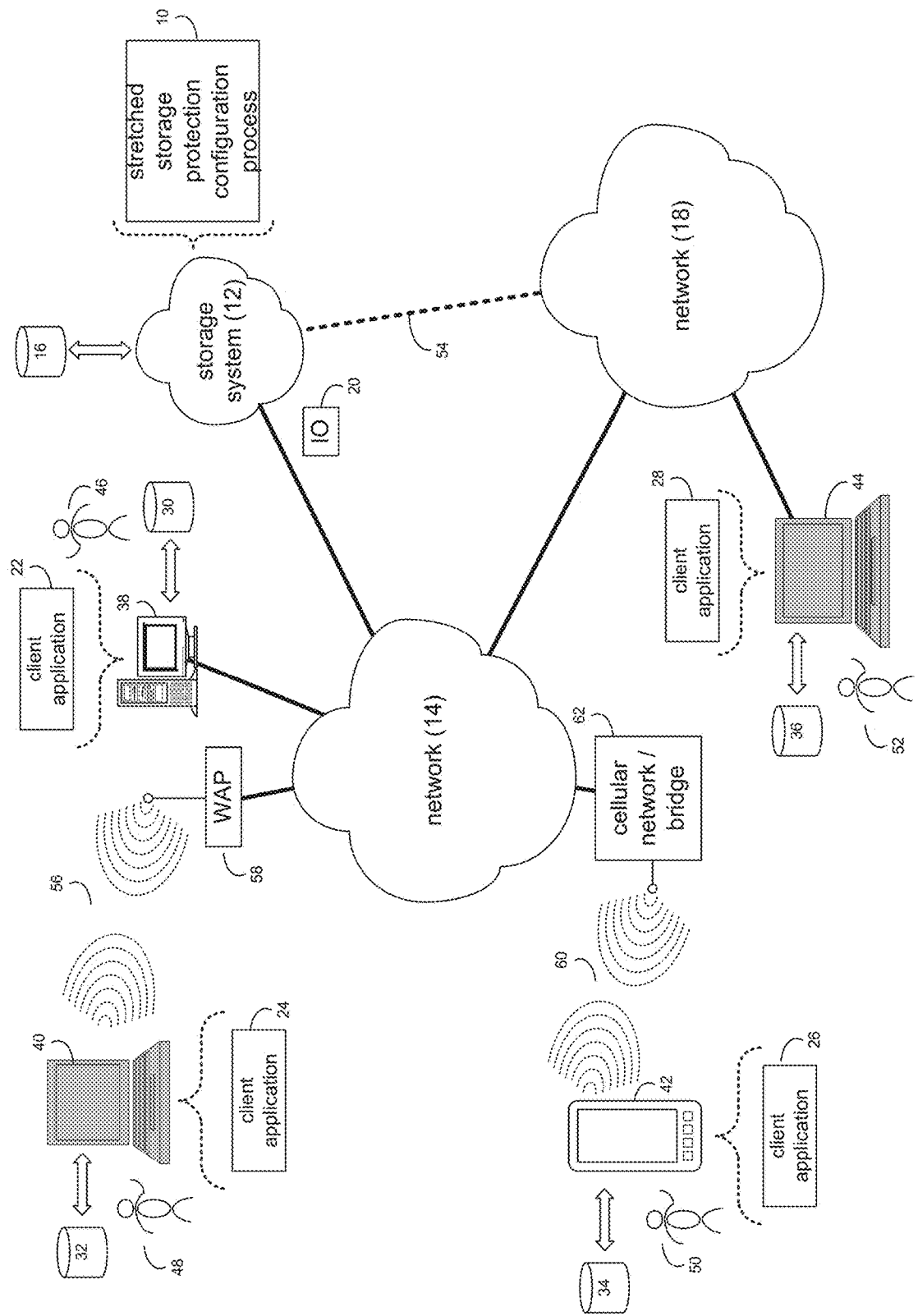
FIG. 1 is an example diagrammatic view of a storage system and a stretched storage protection configuration process coupled to a distributed computing network according to one or more example implementations of the disclosure.

System Overview:

Referring to FIG. 1, there is shown stretched storage protection configuration process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of stretched storage protection configuration process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of stretched storage protection configuration process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a stretched storage protection configuration process, such as stretched storage protection configuration process 10 of FIG. 1, may include but is not limited to, copying a storage protection configuration for one or more storage resources from a first storage array to at least a second storage array in a storage cluster. A communication failure between at least a pair of storage arrays may be detected, thus defining a surviving storage array and at least one failed storage array. The communication failure between the surviving storage array and the at least one failed storage array may be resolved. The storage protection configuration may be synchronized from the surviving storage array to the at least one failed storage array. The storage protection configuration for the one or more storage resources of each storage array of the at least a pair of storage arrays may be arbitrated.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
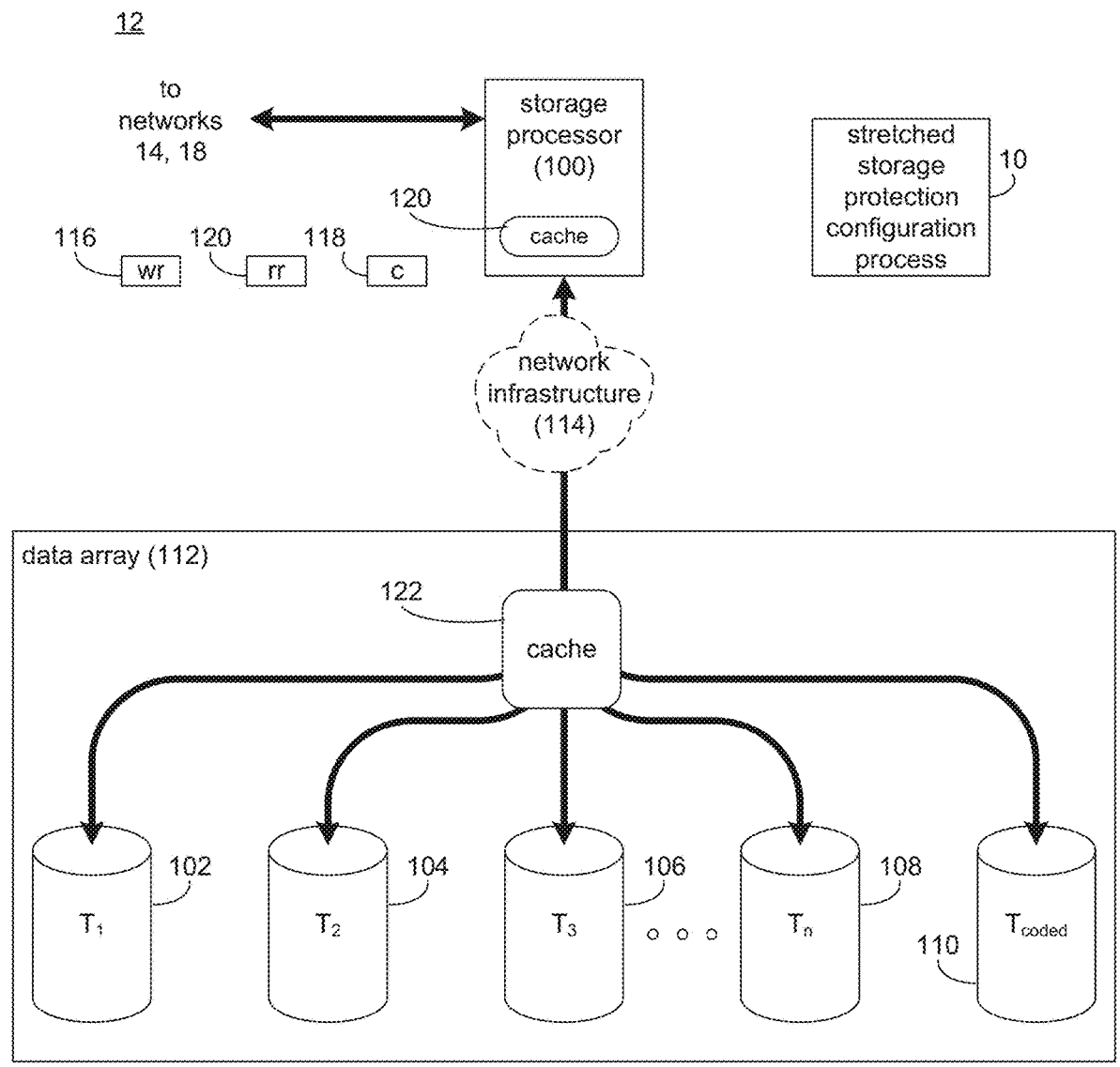
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable"

hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of stretched storage protection configuration process 10. The instruction sets and subroutines of stretched storage protection configuration process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of stretched storage protection configuration process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of stretched storage protection configuration process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of stretched storage protection configuration process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
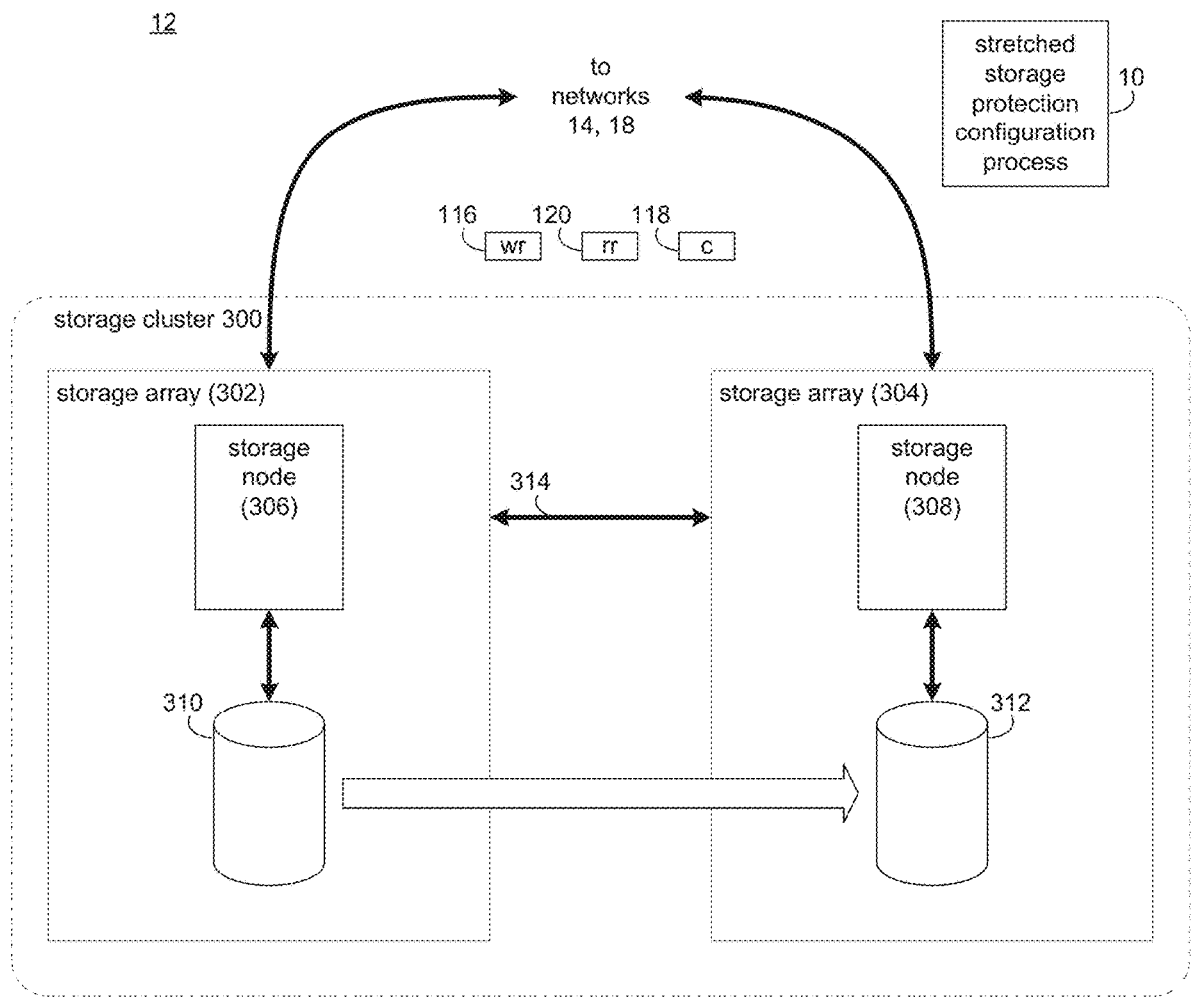
Figure 4:
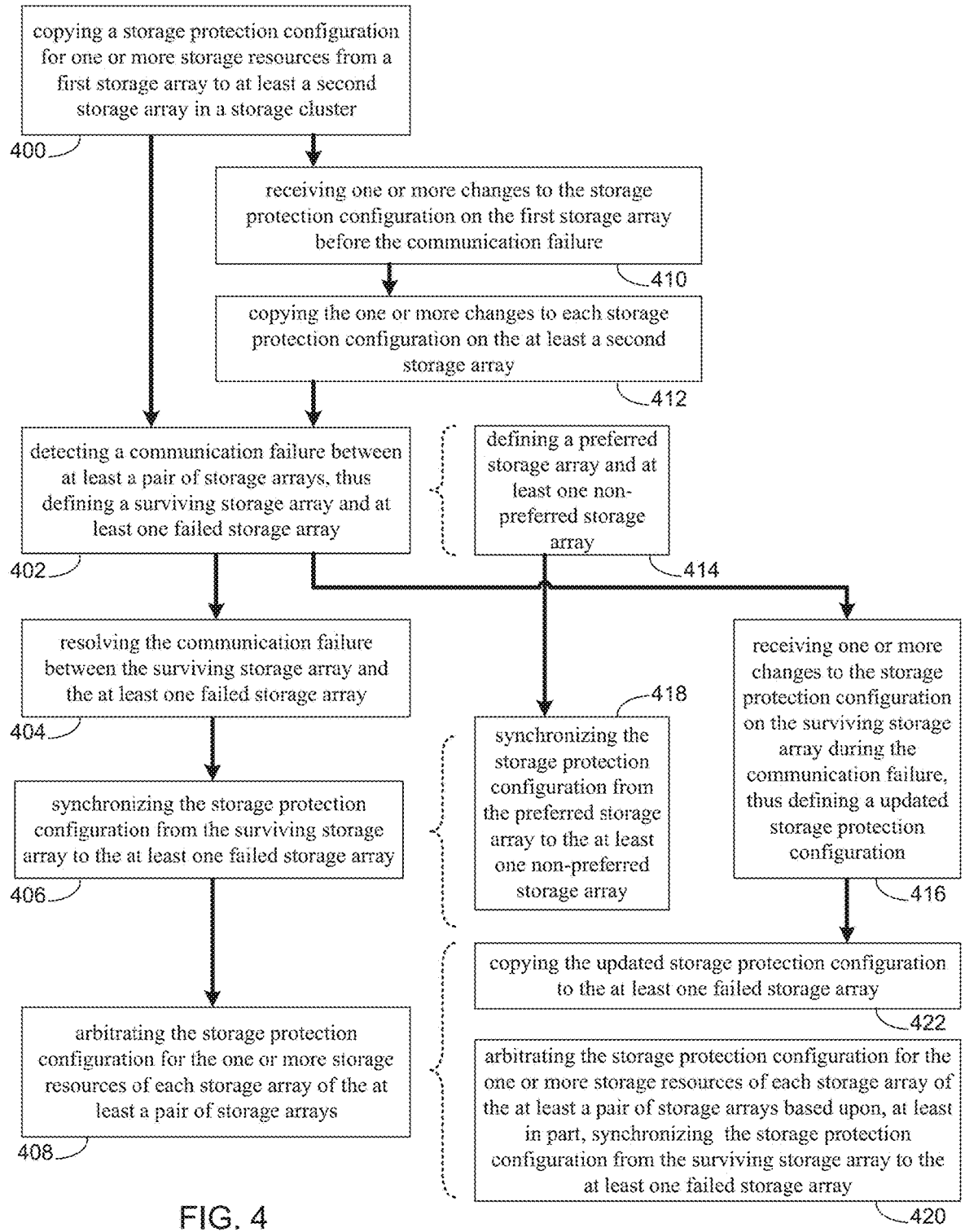
FIG. 4 is an example flowchart of stretched storage protection configuration process according to one or more example implementations of the disclosure.

The Storage Cluster:

Referring also to FIG. 3, storage system 12 may include a storage cluster (e.g., storage cluster 300) of storage arrays (e.g., storage arrays 302, 304). A cluster of storage arrays (e.g., storage cluster 300) may generally include a Federation composed of multiple arrays, where each storage arrays (e.g., storage arrays 302, 304) may include one or more connected nodes/storage processors (e.g., storage nodes 306, 308) with shared back-end drives (e.g., data array 112) and/or back-end storage arrays running a storage stack that communicate over a network.

Referring again to the example of FIG. 3, each storage array (e.g., storage arrays 302, 304) may utilize various storage protocols (e.g., Small Computer System Interface (SCSI), Fibre Channel, Non-Volatile Memory Express (NVMe) over Fabric (NVMe-oF), etc.) for accessing volumes of a storage system. As is known in the art, NVMe or NVM Express® is a specification defining how host software communicates with non-volatile memory across a PCI Express® (PCIe®) bus. As will be discussed in greater detail below, a storage protocol may generally include standards or protocols for physically connecting and transferring data between computing devices and peripheral devices. In some implementations, a storage protocol path may generally include a hardware and/or software communication link between computing devices and peripheral devices.

In some implementations and as will be discussed in greater detail below, a volume may be configured to be an active/active volume that is accessible from any storage array of a storage cluster. As will be discussed in greater detail below, an active/active volume may include a volume replicated on and accessible by each storage array of a storage cluster. For example, a first volume of a first storage array and a second volume of a second storage array may be maintained to be identical.

In some implementations, host servers can read and write to each storage array of the storage cluster. Any write operation to a volume on one storage array may be replicated to the corresponding volume(s) on the other storage array(s) synchronously, while a read operation on the volume can be serviced by the storage array receiving the read command (e.g., "active/active"). In some implementations, each volume may expose the same SCSI image at each storage array, including a SCSI ID (a world-wide unique identifier), so that a host does not see multiple storage arrays but may see a more recognizable multi-pathing setup with a single volume. In this manner, the volume may be "stretched" across multiple storage arrays.

For example, suppose a volume (e.g., first volume 310) is generated on storage array 302 and is configured to be an active/active volume. In this example, a corresponding volume (e.g., second volume 312) may be generated on storage array 304. In some implementations, each storage array (e.g., storage arrays 302, 304) may be configured to access the active/active volume (e.g., either first volume 310 on storage array 302 or second volume 312 on storage array 304). Each storage array (e.g., storage arrays 302, 304) may be physically separated to provide high availability in the event of the failure of one storage array.

In some implementations, a replication link (e.g., replication link 314) may be configured to communicatively couple multiple storage arrays such that changes to a particular volume (e.g., first storage resource 310) may be replicated to each corresponding volume on each other storage array (e.g., second storage resource 312). In this manner, the contents of first volume 310 and second volume 312 may be identical across various storage arrays. As will be discussed in greater detail below, replication links (e.g., replication link 314) may fail and may prevent changes to a particular volume on one storage array from being replicated to the corresponding volumes on each storage array.

The Stretched Storage Protection Process:

Referring also to the examples of FIGS. 4-12 and in some implementations, stretched storage protection configuration process 10 may copy 400 a storage protection configuration for one or more storage resources from a first storage array to at least a second storage array in a storage cluster. A communication failure between at least a pair of storage arrays may be detected 402, thus defining a surviving storage array and at least one failed storage array. The communication failure between the surviving storage array and the at least one failed storage array may be resolved 404. The storage protection configuration may be synchronized 406 from the surviving storage array to the at least one failed storage array. The storage protection configuration for the one or more storage resources of each storage array of the at least a pair of storage arrays may be arbitrated 408.

As will be discussed in greater detail below, implementations of the present disclosure may allow for the stretching and arbitrating storage protection configurations/policies in a multi-node storage cluster. As discussed above, when utilizing stretched volumes across multiple storage arrays, managing storage protection configurations/policies on the stretched volumes may introduce consistency challenges. For example, during storage array unavailability, data may be managed by a single storage array and changes to the storage protection configuration of a particular storage array may result in conflicting storage protection configurations/policies. Accordingly, implementations of the present disclosure may allow for storage protection configurations/policies to be stretched and arbitrated in a storage cluster.

As discussed above and in some implementations, stretched storage protection configuration process 10 may generate an active/active storage resource on a plurality of storage arrays of a storage cluster. Referring again to the example of FIG. 3 and in some implementations, stretched storage protection configuration process 10 may generate an active/active storage resource (e.g., in response to a request from a host, an internal command within storage cluster 300, etc.) for storage cluster 300. For example, stretched storage protection configuration process 10 may generate an active/active storage resource by generating a copy of the active/active storage resource in each storage array. In this example, stretched storage protection configuration process 10 may generate first volume 310 in storage array 302 and second volume 312 in storage array 304. While an example of two volumes on two storage arrays has been provided, it will be appreciated that any number of volumes and/or storage arrays may be used within the scope of the present disclosure.

Figure 5:
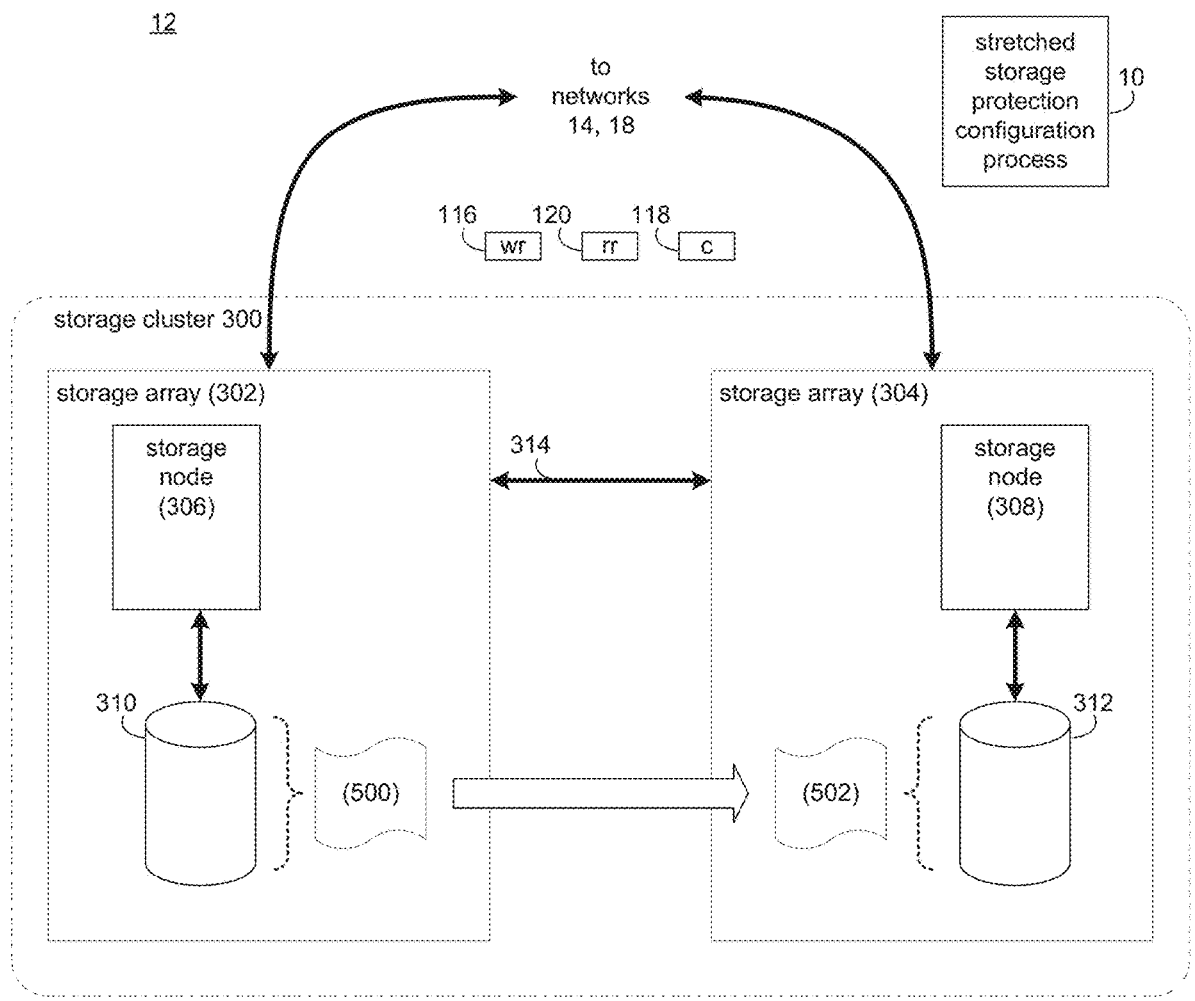
FIGS. 5-12 are example diagrammatic views of the storage system of FIG. 1 according to one or more example implementations of the disclosure.

Stretched storage protection configuration process 10 may receive and/or generate a storage protection configuration for one or more storage resources of a storage array. Referring also to FIG. 5, stretched storage protection configuration process 10 may receive and/or generate a storage protection configuration (e.g., storage protection configuration 500) for one or more storage resources (e.g., volume 310) of a storage array (e.g., storage array 302). While an example of a volume has been described for a storage resource, it will be appreciated that this is for example purposes only. For example, a storage resource may include a volume, a volume group, a virtual volume, a file, a file system, or any other storage container of any type. A storage protection configuration may generally include a configuration/policy that dictates the manner of data protection that is employed on a given storage resource. Data protection may include protection rules that dictate a specific form of data protection, such as local or remote data protection. An example of a protection rule may include, but is not limited to, a snapshot rule that dictates a snapshot schedule to provide regular and consistent local protection. In some implementations, the storage protection configuration (e.g., storage protection configuration 500) may indicate particular protection rules for local storage resources and/or remote storage resources.

Stretched storage protection configuration process 10 may allow a user (e.g., user 46) to configure a single storage protection configuration for a storage resource. For example, stretched storage protection configuration process 10 may provide a user interface for a user to provide or select particular protection rules for the storage resource. As discussed above, when a storage resource is "stretched" across multiple storage arrays of a storage cluster, the storage resource may be referred to as a "stretched storage resource". Accordingly, when a protection configuration/policy is assigned to a 'stretched' storage resource it becomes what is often referred to as a "stretched protection configuration". In this manner, stretched storage protection configuration process 10 may allow a user to assign storage protection configurations/policies to stretched storage resources and/or override storage protection configurations/policies to stretched storage resources.

In some implementations, stretched storage protection configuration process 10 may copy 400 a storage protection configuration for one or more storage resources from a first storage array to at least a second storage array in a storage cluster. Referring again to FIG. 5, stretched storage protection configuration process 10 may generate a copy or clone of a storage protection configuration (e.g., storage protection configuration 500) from a first storage array (e.g., storage array 302) to at least a second storage array (e.g., storage array 304). In this manner, the same storage protection configuration may be replicated on each storage array of the active/active configuration of the storage cluster (e.g., storage cluster 300). As shown in the example of FIG. 5, stretched storage protection configuration process 10 may copy 400 storage protection configuration 500 for storage resource 310 of storage array 302 to storage resource 312 of storage array 304, thus defining storage protection configuration 502.

In some implementations, the copied storage protection configuration (e.g., storage protection configuration 502) may have one or more unique attributes compared to the original or primary storage protection configuration (e.g., storage protection configuration 500). For example, these attributes may include, but are not limited to, a read-only attribute and a management attribute, etc. The read-only attribute may indicate whether the storage protection configuration may be modified. This attribute may be used to indicate that a copied storage protection configuration (e.g., storage protection configuration 502) is read-only while the primary storage protection configuration (e.g., storage protection configuration 500) may be modified by a user. The management attribute may indicate whether the storage cluster (e.g., storage cluster 300) or a user (e.g., user 46) manage the storage protection configuration. While two examples have been provided of particular attributes of a storage protection configuration, it will be appreciated that any number and/or type of attribute may be used within the scope of the present disclosure.

In one example, the primary storage protection configuration (e.g., storage protection configuration 500) may include the following attributes: is_read_only=false; managed_by=User; and managed_by_id=null while the copied storage protection configuration (e.g., storage protection configuration 502) may include the following attributes: is_read_only=true; managed_by=storage cluster 300; and managed_by_id=storage array 302. In this example, the storage protection configuration (e.g., storage protection configuration 500) may be modifiable while the copied storage protection configuration (e.g., storage protection configuration 502) may be read-only. In this manner, stretched storage protection configuration process 10 may maintain consistent storage protection configurations/policies across the storage cluster.

In some implementations, stretched storage protection configuration process 10 may receive 410 one or more changes to the storage protection configuration on the first storage array before the communication failure. For example and continuing with the above example where the primary storage protection configuration (e.g., storage protection configuration 500) is modifiable by a user and the copied storage protection configuration (e.g., storage protection configuration 502) is read-only. In this example, stretched storage protection configuration process 10 may receive 410 one or more changes to the storage protection configuration (e.g., storage protection configuration 500) on the first storage array (e.g., storage array 302). For example, stretched storage protection configuration process 10 may provide a user interface configured to allow a user to modify the storage protection configuration (e.g., storage protection configuration 500). Because the primary storage protection configuration (e.g., storage protection configuration 500) is modifiable, stretched storage protection configuration process 10 may implement that received one or more changes on the storage protection configuration (e.g., storage protection configuration 500) of the first storage array (e.g., storage array 302). Additionally, any attempts to modify the copied storage protection configuration (e.g., storage protection configuration 502) may be prevented as the copied storage protection configuration, at least in this example, is read-only.

In some implementations, stretched storage protection configuration process 10 may copy 412 the one or more changes to each storage protection configuration on the at least a second storage array. Continuing with the above example where stretched storage protection configuration process 10 receives 410 one or more changes to the storage protection configuration (e.g., storage protection configuration 500) on the first storage array (e.g., storage array 302), stretched storage protection configuration process 10 may copy 412 the one or more changes to each storage protection configuration on the at least a second storage array (e.g., storage protection configuration 502 of storage array 304). In this manner, stretched storage protection configuration process 10 may allow a user to provide and maintain consistent storage protection configurations/policies across a storage cluster (e.g., storage cluster 300).

Figure 6:
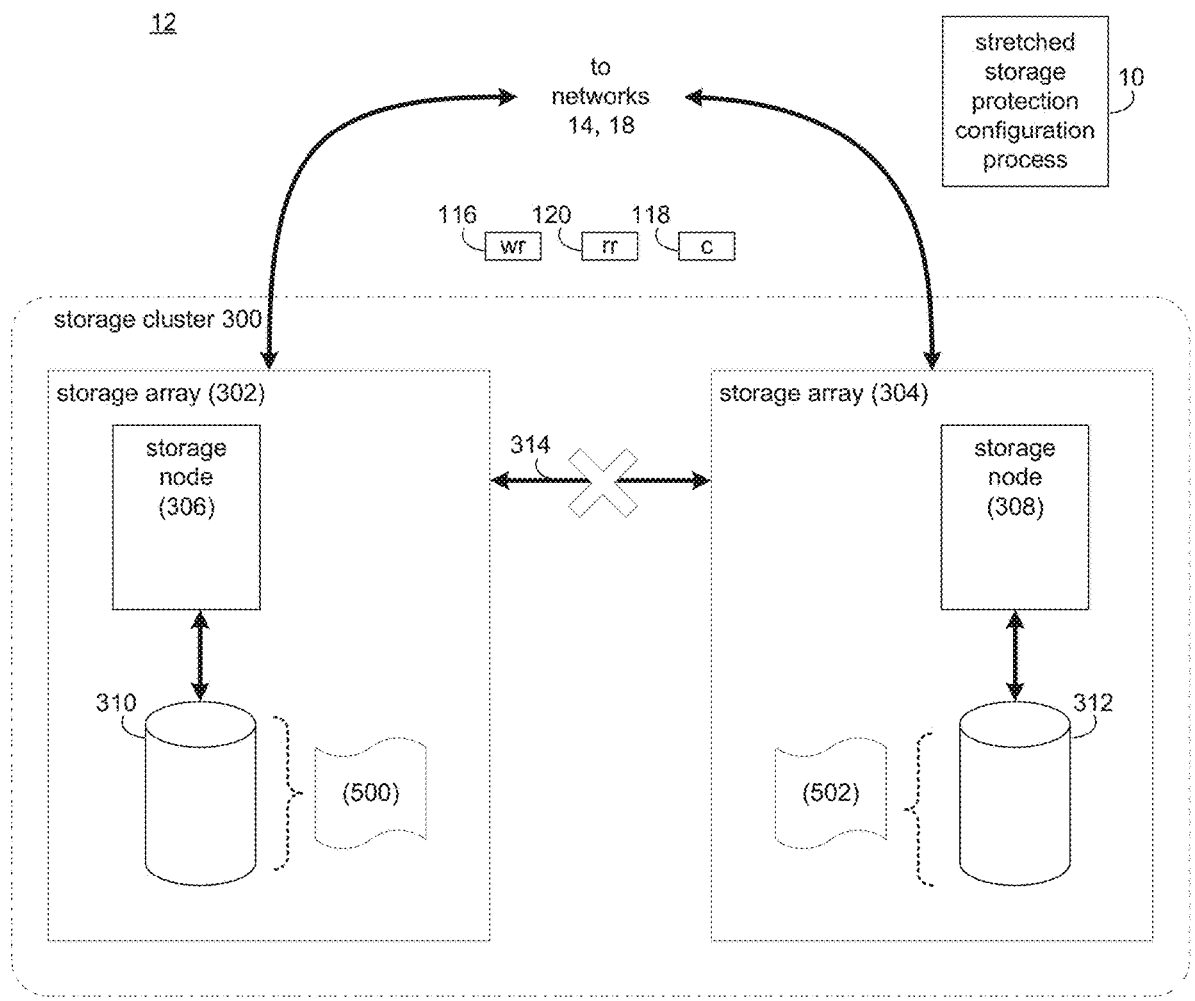
Figure 7:
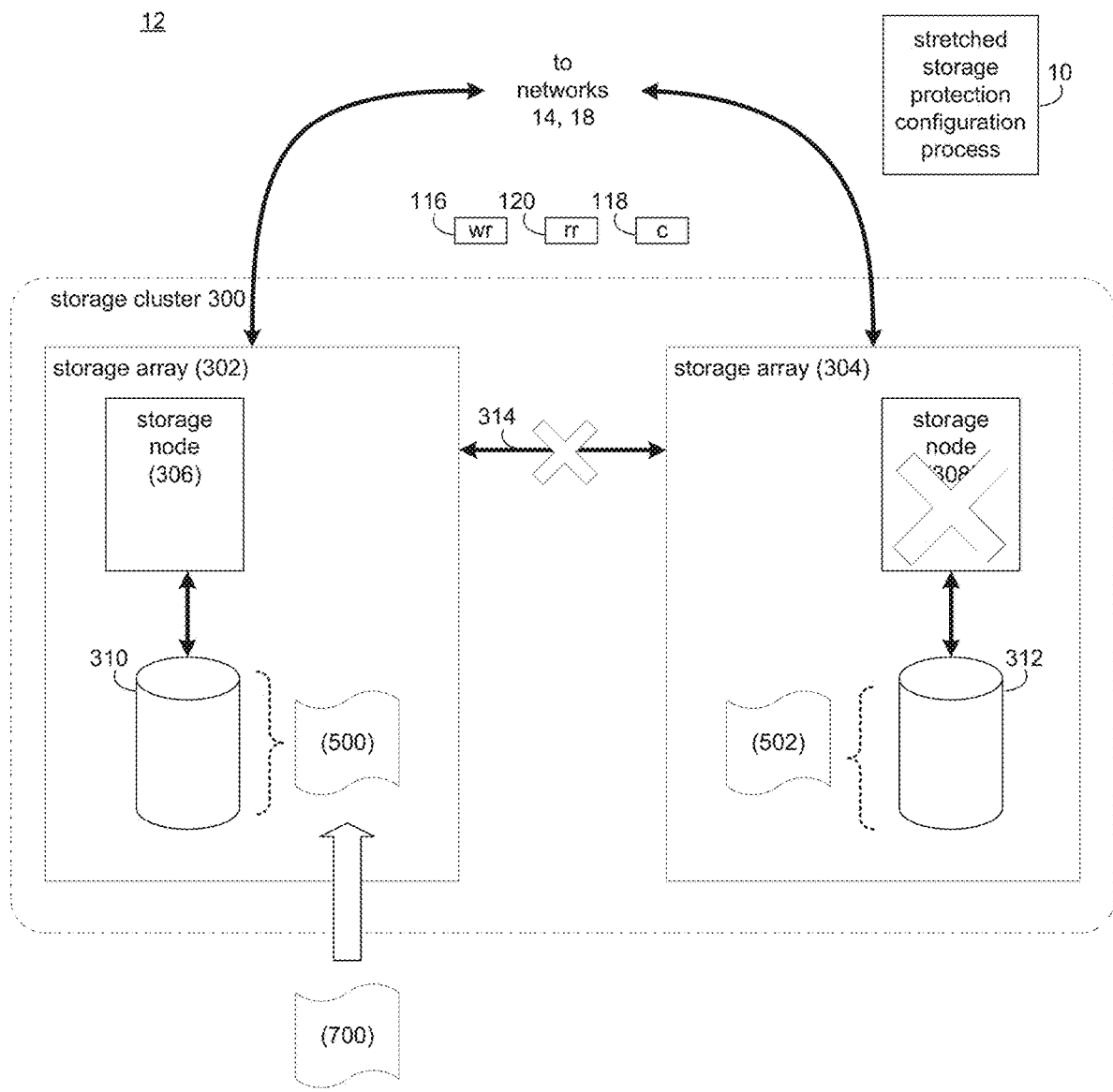

In some implementations, stretched storage protection configuration process 10 may detect 402 a communication failure between at least a pair of storage arrays, thus defining a surviving storage array and at least one failed storage array. For example, during the operation of a storage cluster, various issues may occur that result in a communication failure between the storage arrays of the storage cluster (e.g., a power failure at one of the storage arrays, a communication disruption at one of the storage arrays, component failure within one of the storage arrays, etc.). Stretched storage protection configuration process 10 may detect 402 a communication failure by receiving an indication of a communication failure from one of the storage arrays, an external monitoring component, a storage cluster monitoring component, etc. In this manner, stretched storage protection configuration process 10 may identify a communication failure between the storage arrays in various ways using known techniques and/or components within the scope of the present disclosure. In some implementations, a communication failure between storage arrays of a storage cluster may be referred to as a "fracture". Referring also to FIG. 6, a communication failure or fracture between storage array 302 and storage array 304 may be represented by the "X" on the replication link between storage array 302 and storage array 304.

Detecting 402 a communication failure between at least a pair of storage arrays may include determining a surviving storage array and at least one failed node. For example, a surviving storage array may generally include the storage array that stretched storage protection configuration process 10 utilizes for processing operations within the storage cluster during a communication failure. A failed node may generally include one or more storage arrays that stretched storage protection configuration process 10 does not utilize for processing operations within the storage cluster during a communication failure. For example and as discussed above, in an active/active configuration for one or more storage resources (i.e., a stretched storage resource), each storage array may be configured to process operations on the storage resources of a storage cluster and to mirror the results of their individual operations to each other storage array (and consequently each stretched storage resource) of the storage cluster.

During a communication failure, stretched storage protection configuration process 10 may be unable to guarantee consistent data across stretched storage resources of the storage cluster. Accordingly, stretched storage protection configuration process 10 may utilize one storage array (e.g., a surviving storage array) to process operations on the storage resources of the storage cluster during the communication failure and may not utilize the other storage arrays until the communication failure is resolved. In this manner, the failed storage array(s) may or may not be functional but because of the risk of introducing inconsistent processing of data by each storage array (i.e., a "split-brain" problem), stretched storage protection configuration process 10 may not utilize the other storage arrays. As such, the failed storage array need not fail to be defined as a failed storage array. As will be discussed in greater detail below, the defining of a surviving storage array during a communication failure may be based upon, at least in part, whether a storage array is preferred or non-preferred.

Detecting 402 a communication failure between at least a pair of storage arrays may include defining 414 a preferred storage array and at least one non-preferred storage array. As discussed above and in some implementations, storage arrays in a storage cluster may be configured (e.g., via stretched storage protection configuration process 10) to mirror or otherwise provide operations that modify one copy of the active/active volume to each other copy of the active/active storage resource. In this manner, each copy of the active/active storage resource may appear to a host as a single storage resource. In some implementations, stretched storage protection configuration process 10 may replicate operations on one storage resource of one storage array to another storage resource of another storage array via a replication/communication link.

Referring also to the example of FIG. 5 and in some implementations, suppose replication link 314 fails. In this example, stretched storage protection configuration process 10 may detect 402 a communication failure between storage array 302 and storage array 304. With a communication failure, operations on one storage resource (e.g., first storage resource 310) may no longer be synchronized to another storage resource (e.g., second storage resource 312) of the active/active storage resource. In some implementations, both storage arrays may be functional despite the communication failure. For example, if both storage arrays continue to process operations on the storage resource, it may be difficult or impossible to synchronize data (i.e., storage protection configuration) once the communication failure is resolved as it may be unclear as to which storage protection configuration should be replicated and which storage protection configuration should be overwritten. Accordingly, stretched storage protection configuration process 10 may define 414 a preferred storage array and at least one non-preferred storage array.

As is known in the art, a preferred storage array is a storage array that is preferred to continue processing operations during a communication failure. By contrast, a non-preferred storage array is a storage array that is configured to cease processing operations regardless of whether it is still operational or not during a communication failure. As will be discussed in greater detail below, the preferred storage array may or may not be available during a communication failure.

In some implementations and as will be discussed in greater detail below, after a fracture, it may be desirable to make a storage resource on the non-preferred storage array accessible to hosts. For example, if the preferred storage array fails or is in a site that is experiencing a failure. This process of providing access to the non-preferred storage array's storage resources via the non-preferred storage array may generally be referred to as "promotion". Referring again to FIG. 6, suppose a user (e.g., user 46) selects storage array 302 to be preferred. In some implementations, which storage array is defined as preferred may be random, may be user-determined, may be determined based upon, at least in part, various performance metrics associated with each storage array, may be defined leveraging a separate witness/tiebreaker component external to both storage arrays, etc. Accordingly, stretched storage protection configuration process 10 may define 414 storage array 302 as the preferred storage array and storage array 304 as non-preferred. As will be discussed in greater detail below, stretched storage protection configuration process 10 may arbitrate/reconcile conflicts among the storage protection configurations/policies regardless of which storage array is preferred or non-preferred at the time of the communication failure.

In some implementations, stretched storage protection configuration process 10 may allow a user to redefine a predetermined designation of a preferred storage array. Continuing with the above example, suppose that, prior to the communication failure, storage array 302 was predefined to be the preferred storage array in the event of a communication failure. However, suppose that during the communication failure, storage array 302 is inaccessible. In this example, access to the storage resource (e.g., storage resource 312) may be denied until the non-preferred storage array (e.g., storage array 304) is promoted to the preferred storage array. Accordingly, stretched storage protection configuration process 10 may allow a user to redefine the preferred status of the storage arrays and/or may automatically redefine the preferred status of the storage arrays.

In some implementations, stretched storage protection configuration process 10 may receive 416 one or more changes to the storage protection configuration on the surviving storage array during the communication failure, thus defining a updated storage protection configuration. As discussed above, stretched storage protection configuration process 10 may define a surviving storage array and at least one failed storage array. For example and referring also to FIG. 7, suppose that during a communication failure, storage array 302 is defined as the surviving storage array. Now suppose that a user desires to modify the storage protection configuration (e.g., storage protection configuration 500) of the surviving storage array (e.g., storage array 302). For example, the user may wish to increase the number of snapshots being generated for the user data during the communication failure within the storage cluster. Accordingly, stretched storage protection configuration process 10 may provide a user interface to receive the desired changes to the storage protection configuration (e.g., storage protection configuration 500). In this manner, stretched storage protection configuration process 10 may process the one or more changes on the storage protection configuration (e.g., storage protection configuration 500). Accordingly, stretched storage protection configuration process 10 may utilize the updated storage protection configuration (e.g., updated storage protection configuration 700) for the protection of data of the storage resource (e.g., storage resource 310).

As discussed above and in some implementations, stretched storage protection configuration process 10 may define certain read-only attributes to the storage protection configurations/policies. Referring again to the example of FIG. 7, suppose that storage protection configuration 500 is defined with a read-write attribute. Accordingly, stretched storage protection configuration process 10 may allow a user to modify storage protection configuration 500 as desired (e.g., thus defining updated storage protection configuration 700).

Figure 8:
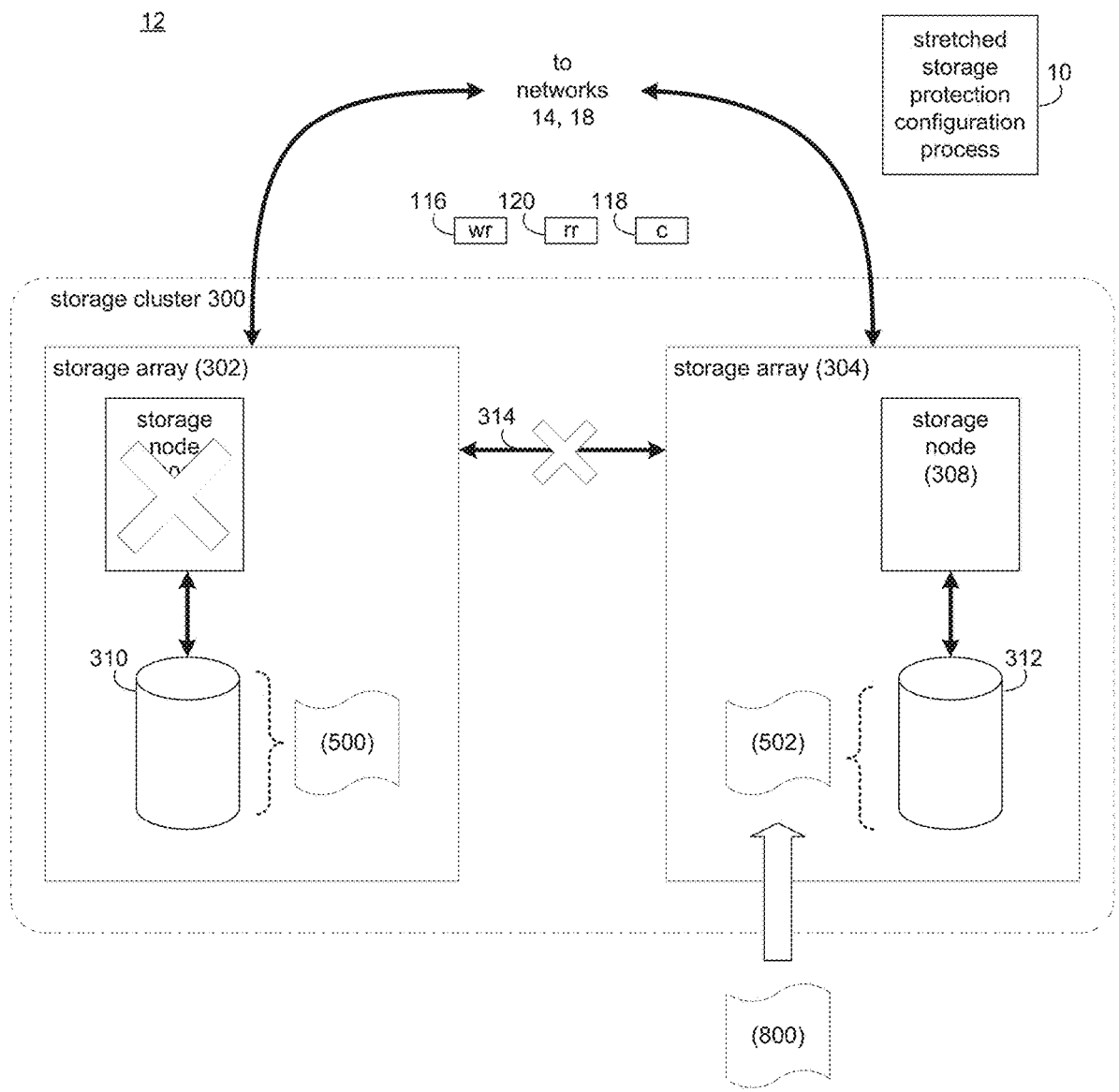

Referring now to FIG. 8, suppose that storage protection configuration 500 is defined with a read-write attribute and that storage protection configuration 500 is copied to storage array 304 with a read-only attribute (e.g., as storage protection configuration 502). In this example, further suppose that storage array 304 is determined to be the surviving storage array and that stretched storage protection configuration process 10 receives 416 one or more changes to the copied storage protection configuration (e.g., storage protection configuration 500). Stretched storage protection configuration process 10 may: 1) leave the read-only protection configuration/policy assigned and protection will continue as advertised by that storage protection configuration; 2) "clone and swap" the read-only storage protection configuration assigned and assign a new read-write clone of the configuration/policy instead; and/or 3) remove the read-only storage protection configuration and assign another read-write storage protection configuration from the surviving storage array (e.g., storage array 304). While three example options have been provided for processing changes to a storage protection configuration with a read-only attribute, it will be appreciated that these are for example purposes only and that any type or number of changes may be performed on the read-only storage protection configuration.

In some implementations, stretched storage protection configuration process 10 may resolve 404 the communication failure between the surviving storage array and the at least one failed storage array. For example, stretched storage protection configuration process 10 may detect or otherwise determine that the communication failure between the surviving storage array and the at least one failed storage array is recovered. As discussed above, stretched storage protection configuration process 10 may receive an indication of the resolution of the communication failure from one of the storage arrays, an external monitoring component, a storage cluster monitoring component, etc. In this manner, stretched storage protection configuration process 10 may identify the resolution of a communication failure between the storage arrays in various ways using known techniques and/or components within the scope of the present disclosure.

Figure 9:
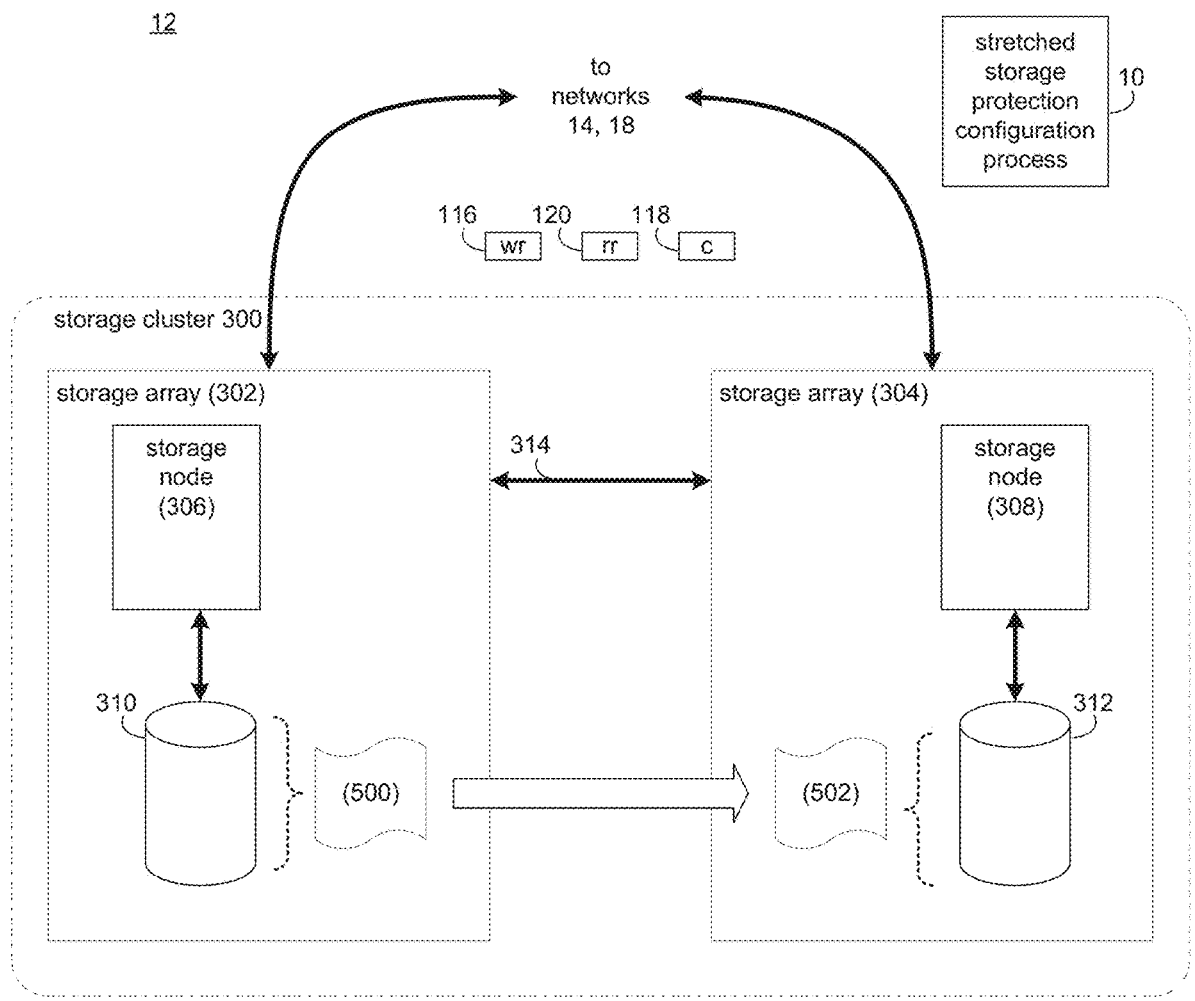

In some implementations, stretched storage protection configuration process 10 may synchronize 406 the storage protection configuration from the surviving storage array to the at least one failed storage array. Synchronizing 406 the storage protection configuration from the surviving storage array to the at least one failed storage array may generally include the copying of the storage protection configuration from the one or more storage resources of the surviving storage array to the one or more storage resources of the at least one failed storage array of the storage cluster. In this manner, stretched storage protection configuration process 10 may synchronize 406 the storage protection configuration such that each storage array of the storage cluster is restored to an active/active relationship. Referring also to FIG. 9, suppose storage array 302 is a surviving storage array and storage array 304 is a failed storage array. In response to resolving the communication failure, stretched storage protection configuration process 10 may synchronize 406 the storage protection configuration from the one or more storage resources (e.g., storage resource 310) of the surviving storage array (e.g., storage array 302) to the at least one failure storage array (e.g., storage array 304). In this manner, storage arrays 302 and 304 may access the same storage protection configuration from the one or more storage resources (e.g., storage resources 310, 312).

Synchronizing 406 the storage protection configuration from the surviving storage array to the at least one restored storage array may include synchronizing 418 the storage protection configuration from the preferred storage array to the at least one non-preferred storage array. As discussed above, stretched storage protection configuration process 10 may provide access to the storage resource(s) of a preferred storage array/preferred storage array during a communication failure and cease to provide access to the corresponding stretched storage resource(s) of the non-preferred storage array/non-preferred storage array during the communication failure. Referring again to the example of FIG. 9, suppose that storage array 302 is predetermined to be preferred storage array and that storage array 304 is, consequently, predetermined to be the non-preferred storage array. In this example, suppose that storage array 302 is accessible during the communication failure (because storage array 302 has not failed). Accordingly, stretched storage protection configuration process 10 may synchronize 418 the storage protection configuration from the storage resource(s) of the preferred storage array (e.g., storage array 302) to the storage resource(s) of the non-preferred storage array (e.g., storage array 304). In this manner, stretched storage protection configuration process 10 may synchronize 418 the storage protection configuration from the preferred storage array (e.g., storage array 302) to the at least one non-preferred storage array (e.g., storage array 304).

Figure 10:
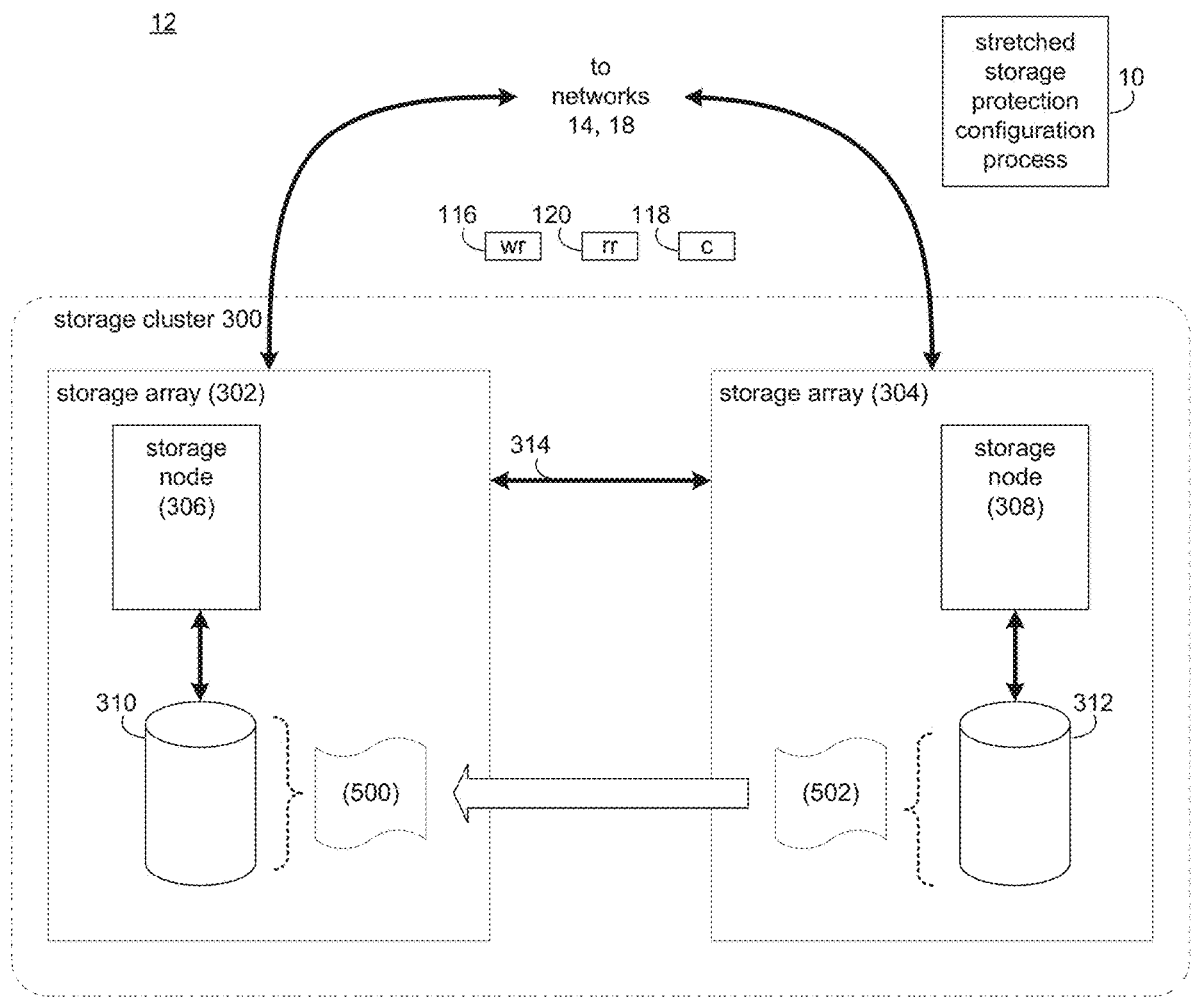

Referring also to FIG. 10, suppose that storage array 302 is predetermined to be preferred storage array and that storage array 304 is, consequently, predetermined to be the non-preferred storage array. In this example, suppose that storage array 302 is inaccessible during the communication failure (because storage array 302 has failed). Accordingly, stretched storage protection configuration process 10 may promote (e.g., automatically or by providing a user the ability to promote) storage array 304 to be the preferred storage array. In this example, stretched storage protection configuration process 10 may synchronize 418 the storage protection configuration from the storage resource(s) of the preferred storage array (e.g., storage array 304) to the storage resource(s) of the non-preferred storage array (e.g., storage array 302). Accordingly, stretched storage protection configuration process 10 may synchronize 418 the storage protection configuration from the preferred storage array to the at least one non-preferred storage array.

In some implementations, stretched storage protection configuration process 10 may arbitrate 408 the storage protection configuration for the one or more storage resources of each storage array of the at least a pair of storage arrays. Arbitrating 408 the storage protection configuration may generally include resolving any conflicts between the storage protection configurations/policies of each storage array. For example and as discussed above, during a communication failure, changes may be made to a storage protection configuration of the storage resource(s) of a surviving storage array. When the communication failure is resolved 404, differing storage protection configurations/policies may exist for each storage array of the storage cluster. Accordingly, stretched storage protection configuration process 10 may arbitrate 408 the storage protection configuration for the storage resources of each storage array be resolving any conflicts between the storage protection configurations/policies after the communication failure is resolved.

Arbitrating 408 the storage protection configuration for the one or more storage resources of each storage array of the at least a pair of storage arrays may include arbitrating 420 the storage protection configuration for the one or more storage resources of each storage array of the at least a pair of storage arrays based upon, at least in part, synchronizing the storage protection configuration from the surviving storage array to the at least one failed storage array. For example, stretched storage protection configuration process 10 may arbitrate 420 the storage protection configuration for the one or more storage resources of each storage array of the at least a pair of storage arrays by copying the storage protection configuration for the one or more storage resources from the surviving storage array to the storage resources of the at least one failed storage array. In this manner, the direction of the storage protection configuration flow between storage arrays may determine which storage protection configuration to apply to one or more stretched storage resources of each storage array.

Referring again to the example of FIG. 9, suppose that storage array 302 is the surviving storage array during a communication failure and that storage array 304 is the failed storage array. Stretched storage protection configuration process 10 may synchronize 406 the storage protection configuration from the storage resource(s) of the surviving storage array (e.g., storage array 302) to the storage resource(s) of the failed storage array (e.g., storage array 304). Accordingly, stretched storage protection configuration process 10 may arbitrate 408 the storage protection configuration (e.g., storage protection configuration 500) of the storage resource (e.g., storage resource 310) of the surviving storage array (e.g., storage array 302) and the storage protection configuration (e.g., storage protection configuration 502) of the storage resource (e.g., storage resource 312) of the failed storage array (e.g., storage array 304) by using the storage protection configuration of the one or more storage resources (e.g., storage resource 310) of the surviving storage array (e.g., storage array 302) for the one or more storage resources (e.g., storage resource 312) of the failed storage array (e.g. storage array 304).

Referring also to FIG. 10, suppose that storage array 304 is the surviving storage array during a communication failure and that storage array 302 is the failed storage array. Stretched storage protection configuration process 10 may synchronize 406 the storage protection configuration from the storage resource(s) of the surviving storage array (e.g., storage array 304) to the storage resource(s) of the failed storage array (e.g., storage array 302). Accordingly, stretched storage protection configuration process 10 may arbitrate 408 the storage protection configuration (e.g., storage protection configuration 500) of the storage resource (e.g., storage resource 312) of the surviving storage array (e.g., storage array 304) and the storage resource (e.g., storage resource 310) of the failed storage array (e.g., storage array 302) by using the storage protection configuration (e.g., storage protection configuration 502) of the one or more storage resources (e.g., storage resource 312) of the surviving storage array (e.g., storage array 304) for the one or more storage resources (e.g., storage resource 310) of the failed storage array (e.g. storage array 302).

Arbitrating 408 the storage protection configuration for the one or more storage resources of each storage array of the at least a pair of storage arrays may include determining whether the storage protection configuration of the surviving storage array has changed during the communication failure. For example, suppose that the storage protection configuration does not change during the communication failure. In this example, stretched storage protection configuration process 10 may arbitrate 408 the storage protection configuration of the one or more storage resources of each storage array by using the unchanged storage protection configurations/policies of each storage array for the stretched storage resources.

In another example, suppose that the storage protection configuration changed during the communication failure. In this example, stretched storage protection configuration process 10 may arbitrate 408 the storage protection configuration of the one or more storage resources of each storage array by using the storage protection configuration of the surviving storage array for the stretched storage resources of each storage array.

Figure 11:
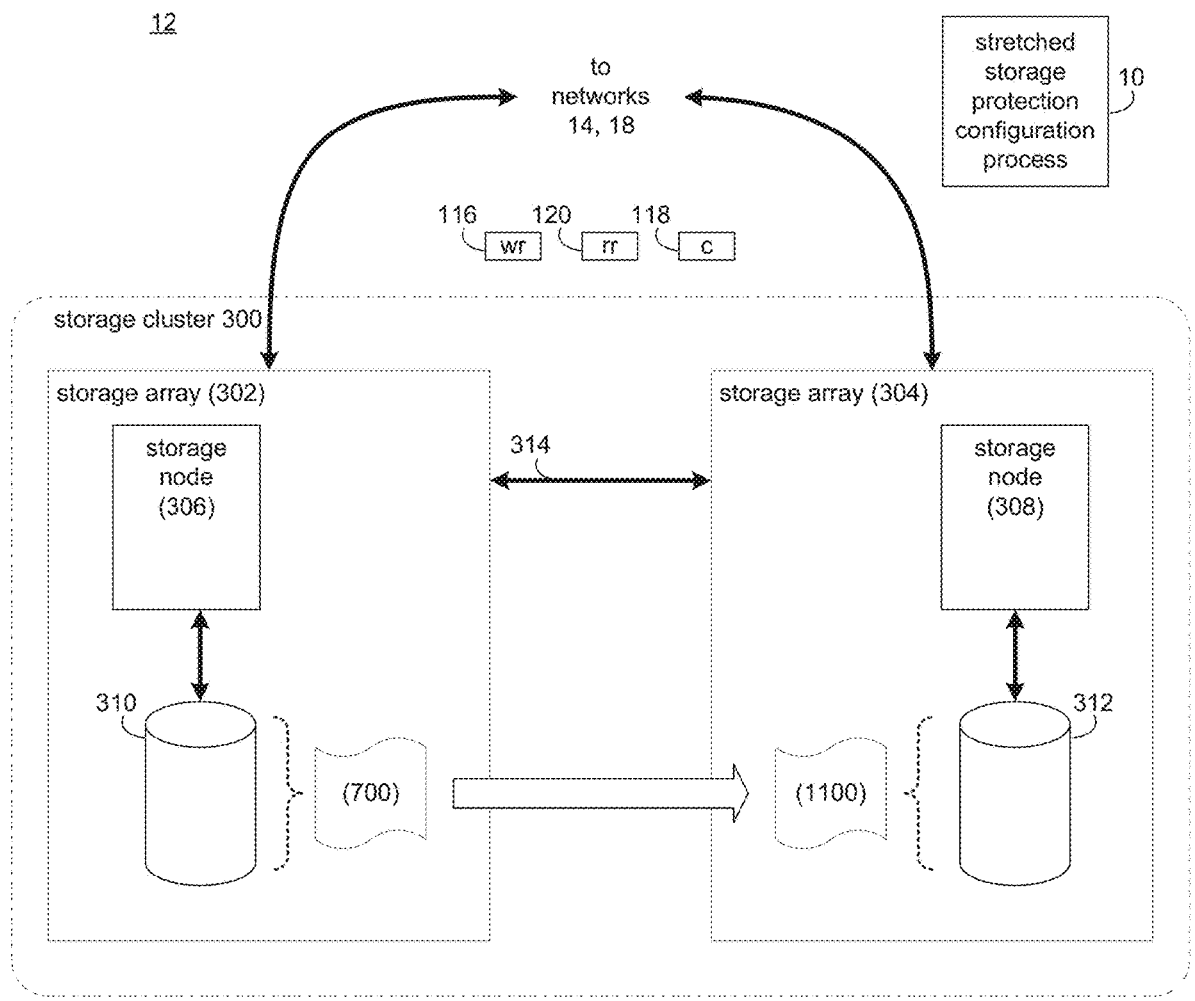

Referring also to FIG. 11, arbitrating 408 the storage protection configuration for the one or more storage resources of each storage array of the at least a pair of storage arrays may include copying 422 the updated storage protection configuration to the at least one failed storage array. Continuing with the above example of FIG. 9 and as discussed above, suppose that stretched storage protection configuration process 10 receives 416 one or more changes for the storage protection configuration (e.g., storage protection configuration 500) on the surviving storage array (e.g., storage array 302) during the communication failure, thus defining an updated storage protection configuration (e.g., updated storage protection configuration 700). In this example, stretched storage protection configuration process 10 may copy 422 the updated storage protection configuration (e.g., updated storage protection configuration 700) to the at least one failed storage array (e.g., failed storage array 304), thus defining an updated copied storage protection configuration (e.g., updated copied storage protection configuration 1100). Accordingly, stretched storage protection configuration process 10 may utilize the updated storage protection configuration (e.g., updated storage protection configuration 700) on each storage array of the storage cluster (e.g., storage cluster 300).

Figure 12:
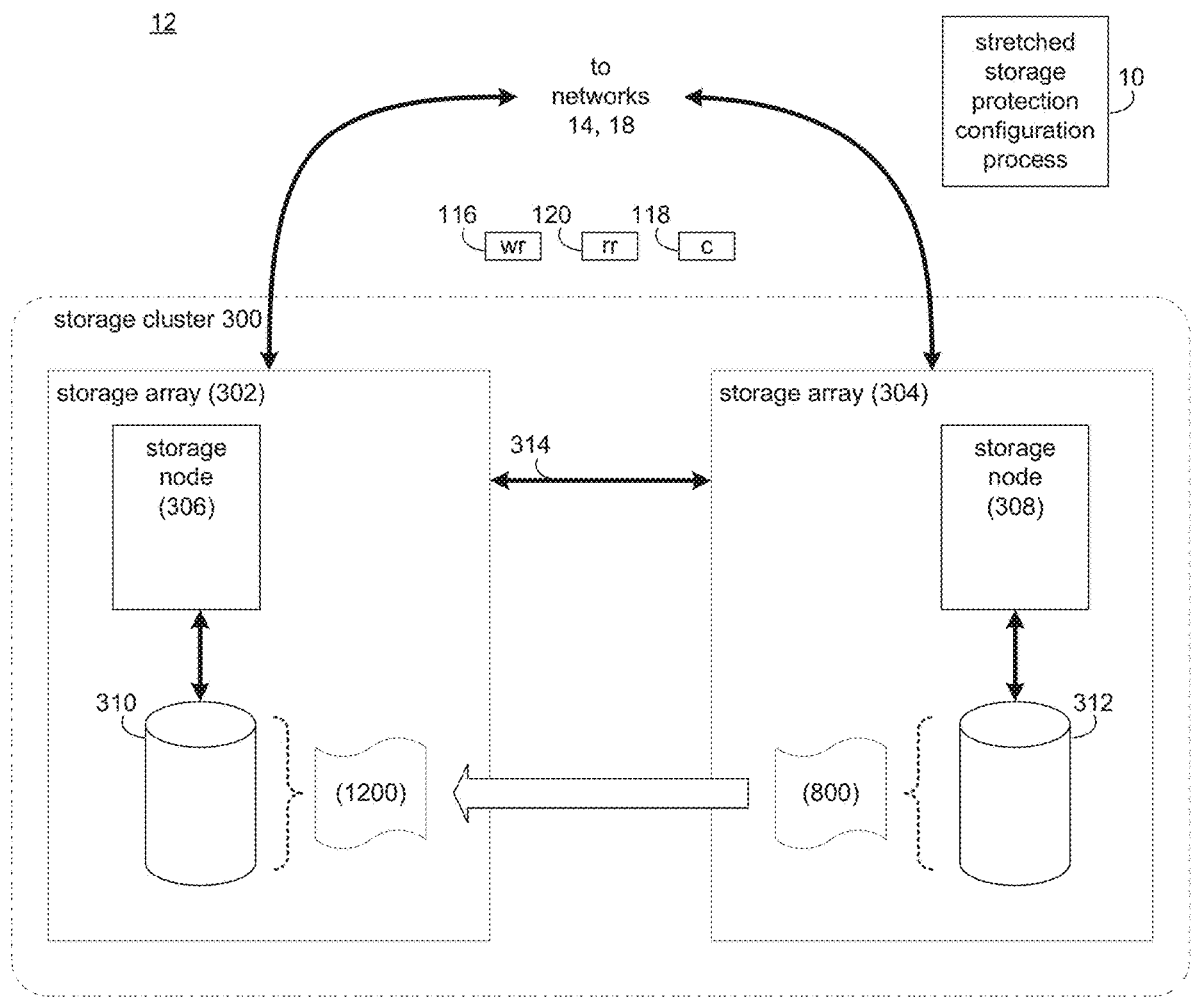

Referring also to FIG. 12, suppose that stretched storage protection configuration process 10 receives 416 one or more changes for the storage protection configuration (e.g., storage protection configuration 502) on the surviving storage array (e.g., storage array 304) during the communication failure, thus defining an updated copied storage protection configuration (e.g., updated copied storage protection configuration 800). In this example, stretched storage protection configuration process 10 may copy 420 the updated storage protection configuration (e.g., updated storage protection configuration 800) to the at least one failed storage array (e.g., storage array 302), thus defining an updated storage protection configuration (e.g., updated storage protection configuration 1200). Accordingly, stretched storage protection configuration process 10 may utilize the updated storage protection configuration (e.g., updated storage protection configuration 800) on each storage array of the storage cluster (e.g., storage cluster 300).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of d features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   processing a primary storage protection configuration across multiple storage arrays of a storage cluster;
   copying the primary storage protection configuration for one or more storage resources from a first storage array to at least a second storage array in the storage cluster, wherein a copied storage protection configuration has at least one or more unique attributes compared to the primary storage protection configuration;
   detecting a communication failure between at least a pair of storage arrays, thus defining a surviving storage array and at least one failed storage array;
   defining a preferred storage array and at least one non-preferred storage array between the at least a pair of storage arrays when both the first and second storage arrays are functional despite the communication failure, wherein defining of the surviving storage array during the communication failure is based upon, at least in part, whether at least one of the pair of storage arrays is the preferred storage array or the non-preferred storage array;
   resolving the communication failure between the surviving storage array and the at least one failed storage array;
   synchronizing the primary storage protection configuration from the surviving storage array to the at least one failed storage array; and
   arbitrating the primary storage protection configuration for the one or more storage resources of each storage array of the at least a pair of storage arrays.

2. The computer-implemented method of claim 1, wherein synchronizing the primary storage protection configuration from the surviving storage array to the at least one failed storage array includes:
   synchronizing the primary storage protection configuration from the preferred storage array to the at least one non-preferred storage array.

3. The computer-implemented method of claim 1, further comprising:
   receiving one or more changes to the primary storage protection configuration on the first storage array before the communication failure; and
   copying the one or more changes to each primary storage protection configuration on the at least a second storage array.

4. The computer-implemented method of claim 1, further comprising:
   receiving one or more changes to the copied storage protection configuration on the surviving storage array during the communication failure, thus defining an updated storage protection configuration.

5. The computer-implemented method of claim 4, wherein arbitrating the primary storage protection configuration for the one or more storage resources of each storage array of the at least a pair of storage arrays includes:
   copying the updated storage protection configuration on the at least one failed storage array.

6. The computer-implemented method of claim 1, wherein arbitrating the primary storage protection configuration for the one or more storage resources of each storage array of the at least a pair of storage arrays
   based upon, at least in part, synchronizing the copied storage protection configuration from the surviving storage array to the at least one failed storage array.

7. A computer program product residing on a non-transitory computer readable medium having a plurality of instructions stored thereon which, when executed by a processor, cause the processor to perform operations comprising:
   processing a primary storage protection configuration across multiple storage arrays of a storage cluster;
   copying the primary storage protection configuration for one or more storage resources from a first storage array to at least a second storage array in the storage cluster, wherein a copied storage protection configuration has at least one or more unique attributes compared to the primary storage protection configuration;
   detecting a communication failure between at least a pair of storage arrays, thus defining a surviving storage array and at least one failed storage array;
   defining a preferred storage array and at least one non-preferred storage array between the at least a pair of storage arrays when both the first and second storage arrays are functional despite the communication failure, wherein defining of the surviving storage array during the communication failure is based upon, at least in part, whether at least one of the pair of storage arrays is the preferred storage array or the non-preferred storage array;
   resolving the communication failure between the surviving storage array and the at least one failed storage array;
   synchronizing the primary storage protection configuration from the surviving storage array to the at least one failed storage array; and
   arbitrating the primary storage protection configuration for the one or more storage resources of each storage array of the at least a pair of storage arrays.

8. The computer program product of claim 7, wherein synchronizing the primary storage protection configuration from the surviving storage array to the at least one failed storage array includes:
   synchronizing the primary storage protection configuration from the preferred storage array to the at least one non-preferred storage array.

9. The computer program product of claim 7, wherein the operations further comprise:
   receiving one or more changes to the primary storage protection configuration on the first storage array before the communication failure; and
   copying the one or more changes to each primary storage protection configuration on the at least a second storage array.

10. The computer program product of claim 7, wherein the operations further comprise:
    receiving one or more changes to the copied storage protection configuration on the surviving storage array during the communication failure, thus defining an updated storage protection configuration.

11. The computer program product of claim 10, wherein arbitrating the primary storage protection configuration for the one or more storage resources of each storage array of the at least a pair of storage arrays includes:
    copying the updated storage protection configuration on the at least one failed storage array.

12. The computer program product of claim 7, wherein arbitrating the primary storage protection configuration for the one or more storage resources of each storage array of the at least a pair of storage arrays
based upon, at least in part, synchronizing the copied storage protection configuration from the surviving storage array to the at least one failed storage array.

13. A computing system comprising:
a memory; and
a processor configured to process a primary storage protection configuration across multiple storage arrays of a storage cluster, wherein the processor is further configured to copy the primary storage protection configuration for one or more storage resources from a first storage array to at least a second storage array in the storage cluster, wherein a copied storage protection configuration has at least one or more unique attributes compared to the primary storage protection configuration, wherein the processor is further configured to detect a communication failure between at least a pair of storage arrays, thus defining a surviving storage array and at least one failed storage array, wherein the processor is further configured to define a preferred storage array and at least one non-preferred storage array between the at least a pair of storage arrays when both the first and second storage arrays are functional despite the communication failure, wherein defining of the surviving storage array during the communication failure is based upon, at least in part, whether at least one of the pair of storage arrays is the preferred storage array or the non-preferred storage array, wherein the processor is further configured to resolve the communication failure between the surviving storage array and the at least one failed storage array, wherein the processor is further configured to synchronize the primary storage protection configuration from the surviving storage array to the at least one failed storage array, and wherein the processor is further configured to arbitrate the primary storage protection configuration for the one or more storage resources of each storage array of the at least a pair of storage arrays.

14. The computing system of claim 13, wherein synchronizing the primary storage protection configuration from the surviving storage array to the at least one failed storage array includes:
synchronizing the primary storage protection configuration from the preferred storage array to the at least one non-preferred storage array.

15. The computing system of claim 13, wherein the processor is further configured to:
receive one or more changes to the primary storage protection configuration on the first storage array before the communication failure; and
copy the one or more changes to each primary storage protection configuration on the at least a second storage array.

16. The computing system of claim 13, wherein the processor is further configured to:
receive one or more changes to the copied storage protection configuration on the surviving storage array during the communication failure, thus defining an updated storage protection configuration.

17. The computing system of claim 16, wherein arbitrating the primary storage protection configuration for the one or more storage resources of each storage array of the at least a pair of storage arrays includes:
copy the updated storage protection configuration on the at least one failed storage array.

* * * * *